(12) United States Patent
Chaudhary et al.

(10) Patent No.: US 8,859,654 B2
(45) Date of Patent: Oct. 14, 2014

(54) HEAT STABILIZED POLYMERIC COMPOSITION WITH EPOXIDIZED FATTY ACID ESTER PLASTICIZER

(75) Inventors: Bharat I. Chaudhary, Princeton, NJ (US); Scott Wills, Yardley, PA (US); Manish Mundra, Somerset, NJ (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 232 days.

(21) Appl. No.: 13/498,763

(22) PCT Filed: Sep. 29, 2010

(86) PCT No.: PCT/US2010/050699
§ 371 (c)(1),
(2), (4) Date: Mar. 28, 2012

(87) PCT Pub. No.: WO2011/041396
PCT Pub. Date: Apr. 7, 2011

(65) Prior Publication Data
US 2012/0181058 A1   Jul. 19, 2012

Related U.S. Application Data

(60) Provisional application No. 61/247,329, filed on Sep. 30, 2009, provisional application No. 61/247,383, filed on Sep. 30, 2009, provisional application No. 61/247,427, filed on Sep. 30, 2009, provisional application No. 61/288,713, filed on Dec. 21, 2009.

(51) Int. Cl.
| | | |
|---|---|---|
| *C08K 5/07* | (2006.01) | |
| *C08K 5/16* | (2006.01) | |
| *C08K 5/1515* | (2006.01) | |
| *C08L 27/06* | (2006.01) | |
| *C08K 5/098* | (2006.01) | |
| *C08K 5/00* | (2006.01) | |
| *H01B 3/44* | (2006.01) | |

(52) U.S. Cl.
CPC . *C08K 5/07* (2013.01); *C08K 5/098* (2013.01); *C08K 5/1515* (2013.01); *C08K 5/0016* (2013.01); *H01B 3/443* (2013.01); *C08K 5/0091* (2013.01)
USPC ........... 524/114; 524/394; 524/434; 524/436; 524/437

(58) Field of Classification Search
CPC .............. C08K 5/07; C08K 5/16; C08K 5/91; C08K 5/98; C08K 5/1515; C08L 27/06
USPC ....... 524/114, 394, 434, 436, 437; 170/110 V
See application file for complete search history.

(56) References Cited

U.S. PATENT DOCUMENTS

| | | |
|---|---|---|
| 2,397,592 A | 4/1946 | Blades |
| 2,403,215 A | 7/1946 | Foster |
| 2,458,484 A | 1/1949 | Terry et al. |
| 2,500,918 A | 3/1950 | Rueter et al. |
| 2,618,622 A | 11/1952 | Grummit et al. |
| 2,666,752 A | 1/1954 | Grummit et al. |
| 3,138,566 A | 6/1964 | Arnold |
| 3,409,580 A | 11/1968 | Alzner et al. |
| 3,639,318 A | 2/1972 | Tijunelis et al. |
| 3,668,091 A | 6/1972 | French et al. |
| 3,712,875 A | 1/1973 | Tijunelis |
| 3,778,465 A | 12/1973 | Barnstorf |
| 3,780,140 A | 12/1973 | Hammer |
| 3,868,341 A | 2/1975 | Sauer et al. |
| 3,872,187 A | 3/1975 | Fath |
| 3,891,694 A | 6/1975 | Mills et al. |
| 4,083,816 A | 4/1978 | Frankel et al. |
| 4,346,145 A | 8/1982 | Choi et al. |
| 4,421,886 A | 12/1983 | Worschech |
| 4,426,477 A | 1/1984 | Yasumatsu et al. |
| 4,556,694 A | 12/1985 | Wallace |
| 4,605,694 A | 8/1986 | Walker |
| 4,612,192 A | 9/1986 | Scheuffgen et al. |
| 4,613,533 A | 9/1986 | Loomis et al. |
| 4,627,993 A | 12/1986 | Loomis |
| 4,670,494 A | 6/1987 | Semenza, Jr. |
| 4,857,600 A | 8/1989 | Gross et al. |
| 5,225,108 A | 7/1993 | Bae et al. |
| 5,227,417 A | 7/1993 | Kroushl |
| 5,246,783 A | 9/1993 | Spenadel et al. |

(Continued)

FOREIGN PATENT DOCUMENTS

| | | |
|---|---|---|
| CA | 1188445 | 6/1985 |
| CN | 1341681 A | 3/2002 |

(Continued)

OTHER PUBLICATIONS

Vertellus Performance Materials Inc.; Flexricin P-8 Technical Data Sheet, Nov. 2006.
Grummitt et al., Acetylated Castor Oil Industrial and Engineering Chemistry, vol. 37, No. 5, May 1945, pp. 485-491.
Orellana-Coca et al., Journal of Molecular Catalysis B: Enzymatic 44 (2007) 133-137.
Du et al., JAOCS, vol. 81, No. 4 (2004) 477-480.
Sheehan et al, A Look Back at the U.S. Department of Energy's Aquatic Species Program: Biodiesel from Algae, National Renewable Energy Laboratory, Colorado, Jul. 1998, pp. 1-294.
Greenspan et al., Industrial and Engineering Chemistry, 445(12), 1953, pp. 2722-2726.
Thomson Scientific, Mar. 13, 2009, London, GB.
Greenspan et al., The Journal of the American Oil Chemists Society, 33, 1956, pp. 391-394.

(Continued)

*Primary Examiner* — Kriellion Sanders
(74) *Attorney, Agent, or Firm* — Whyte Hirschboeck Dudek S.C.

(57) ABSTRACT

The present disclosure is directed to a polymeric composition containing a vinyl chloride resin and an epoxidized fatty acid ester. The polymeric composition also includes a heat stabilizing composition. The heat stabilizing composition includes a first metal salt, a second metal salt, and a β-diketone. The epoxidized fatty acid ester is the primary, or the sole, plasticizer in the polymeric composition. The present polymeric composition finds advantageous application as a coating for wire and cable.

9 Claims, No Drawings

(56) References Cited

U.S. PATENT DOCUMENTS

| | | |
|---|---|---|
| 5,270,366 A | 12/1993 | Hein |
| 5,278,236 A | 1/1994 | Case et al. |
| 5,430,108 A | 7/1995 | Schlosberg et al. |
| 5,454,806 A | 10/1995 | Shinonome |
| 5,464,903 A | 11/1995 | Hofman |
| 5,466,267 A | 11/1995 | Baillargeon et al. |
| 5,495,033 A | 2/1996 | Basu et al. |
| 5,575,965 A | 11/1996 | Caronia et al. |
| 5,736,605 A | 4/1998 | Oshima |
| 5,756,570 A | 5/1998 | Hoch et al. |
| 5,886,072 A | 3/1999 | Linsky et al. |
| 6,063,846 A | 5/2000 | Weng et al. |
| 6,114,425 A | 9/2000 | Day et al. |
| 6,274,750 B1 | 8/2001 | Sato et al. |
| 6,417,260 B1 | 7/2002 | Weng et al. |
| 6,437,170 B1 | 8/2002 | Thil et al. |
| 6,451,958 B1 | 9/2002 | Fan et al. |
| 6,496,629 B2 | 12/2002 | Ma et al. |
| 6,608,142 B1 | 8/2003 | Weng et al. |
| 6,706,815 B2 | 3/2004 | Marchand et al. |
| 6,714,707 B2 | 3/2004 | Rossi et al. |
| 6,734,241 B1 | 5/2004 | Nielsen et al. |
| 6,797,753 B2 | 9/2004 | Benecke et al. |
| 6,849,694 B2 | 2/2005 | Hata |
| 6,949,597 B2 | 9/2005 | Nielsen et al. |
| 7,700,675 B2 | 4/2010 | Bueno de Almeida et al. |
| 2002/0013396 A1 | 1/2002 | Benecke et al. |
| 2004/0122159 A1 | 6/2004 | Mhetor et al. |
| 2005/0090590 A1 | 4/2005 | Nielsen et al. |
| 2005/0203230 A1 | 9/2005 | Kadakia et al. |
| 2006/0025544 A1 | 2/2006 | Koube et al. |
| 2006/0276575 A1 | 12/2006 | Hamaguchi et al. |
| 2007/0100049 A1 | 5/2007 | Ishizuka et al. |
| 2007/0135562 A1 | 6/2007 | Freese et al. |
| 2008/0200595 A1 | 8/2008 | Hinault et al. |
| 2008/0227993 A1 | 9/2008 | Zuckerman |
| 2009/0149585 A1 | 6/2009 | DeQuadros Junior et al. |
| 2009/0149586 A1 | 6/2009 | DeQuadros Junior et al. |
| 2009/0312478 A1 | 12/2009 | Hasegawa et al. |
| 2010/0010127 A1 | 1/2010 | Barki et al. |
| 2010/0256278 A1 | 10/2010 | Harada et al. |
| 2011/0076502 A1 | 3/2011 | Chaudhary et al. |
| 2011/0272174 A1 | 11/2011 | Chaudhary et al. |
| 2013/0005937 A1 | 1/2013 | Cramail et al. |

FOREIGN PATENT DOCUMENTS

| | | |
|---|---|---|
| CN | 101070510 | 11/2007 |
| CN | 101108982 | 1/2008 |
| CN | 101591588 | 12/2009 |
| CN | 101824193 | 9/2010 |
| CN | 101914219 | 12/2010 |
| EP | 0192961 A1 | 9/1986 |
| EP | 0358179 A2 | 3/1990 |
| EP | 0364717 A1 | 4/1990 |
| EP | 0393813 A1 | 10/1990 |
| EP | 0473915 A1 | 3/1992 |
| EP | 0565984 A1 | 10/1993 |
| EP | 1361039 | 11/2003 |
| EP | 0986606 B1 | 8/2004 |
| EP | 1218443 | 10/2005 |
| EP | 1624014 | 8/2006 |
| EP | 2070977 A2 | 6/2009 |
| EP | 2245089 A1 | 5/2012 |
| FR | 1437722 | 5/1966 |
| GB | 499931 | 1/1939 |
| GB | 790314 | 2/1958 |
| GB | 910543 | 11/1962 |
| GB | 934689 | 8/1963 |
| GB | 1022920 | 3/1966 |
| GB | 1102506 | 2/1968 |
| GB | 1300526 | 12/1972 |
| GB | 1341623 | 12/1973 |
| GB | 1415770 | 11/1975 |
| GB | 2155021 | 9/1985 |
| JP | S5247948 B2 | 12/1977 |
| JP | S61-016950 | 1/1986 |
| JP | 04-059851 | 2/1992 |
| JP | H04-085354 | 3/1992 |
| JP | H04-261452 | 9/1992 |
| JP | 2000-319468 | 11/2000 |
| JP | 2003-064233 | 3/2003 |
| JP | 2003-297149 | 10/2003 |
| JP | 2004-311064 | 11/2004 |
| JP | 2010-042669 | 2/2010 |
| WO | 97/30115 | 8/1997 |
| WO | 0114466 | 3/2001 |
| WO | 01/98404 | 12/2001 |
| WO | 2004/052977 | 6/2004 |
| WO | 2007/006489 | 1/2007 |
| WO | 2008/081332 | 7/2008 |
| WO | 2008/122364 A1 | 10/2008 |
| WO | 2009/069491 A1 | 6/2009 |
| WO | 2009/102877 | 8/2009 |
| WO | 2011/041372 | 4/2011 |
| WO | 2011/041380 | 4/2011 |
| WO | 2011/041388 | 4/2011 |
| WO | 2013/003225 A2 | 1/2013 |

OTHER PUBLICATIONS

Gan et al., European Polymer Journal, 31(8), 1994, pp. 719-724.
Rehberg et al., Ind. Eng. Chem., 44(9) 1952, pp. 2191-2195.
Taylor, Proceedings of the World Conference on Oilseed Technology and Utilization, American Oil Chemists Society, Champaign, 1992, pp. 152-165.
Tekin et al., JAOCS, 77(3), 2000, pp. 281-283.
Cai et al., Eur. J. Lipid Sci., Technol., 2008, 110, pp. 341-346.
Campanella et al., Chemical Engineering Journal, 144 (2008), pp. 466-475.
Santacesara et al, Chemical Engineering Journal, vol. 173, Issue 1, Sep. 1, 2011, pp. 198-209.
Senzana et al, Journal of the Americal Oil Chemists Society, vol. 78, No. 7 (2001), pp. 725-731.
Haas, Fuel Processing Technology 86, 2005, pp. 1087-1096.
Freedman et al., JAOCS, 63(10), 1986, pp. 1375-1380.
Morgenstern, B., Use of Modified Fatty Acid Esters as Plasticizers for PVC dated Sep. 12, 2003.
Morgenstern, B., Epoxidized Fatty Acid Esters as Plasticizers for PVC dated Apr. 22, 2005.
Morgenstern, B., Epoxidized Fatty Acid Esters as Plasticizers for PVC, presented at the 7th Freiberg Polymer Conference, Apr. 21 and 22, 2005.
Opposition filed against EP2245089 dated Jan. 9, 2013.
International Search Report and Written Opinion of PCT/US2009/033935 dated May 18, 2009.
International Preliminary Report on Patentability of PCT/US2009/033935 dated Aug. 26, 2010.
International Search Report and Written Opinion of PCT/US2010/050654 dated Nov. 9, 2010.
International Search Report and Written Opinion of PCT/US2010/050676 dated Jan. 12, 2011.
International Preliminary Report on Patentability of PCT/US2011/041557 dated Aug. 31, 2012.
International Search Report and Written Opinion of PCT/US2011/041557 dated Sep. 5, 2011.
International Preliminary Report on Patentability of PCT/US2011/050690 dated Jan. 12, 2012.
International Search Report and Written Opinion of PCT/US2010/050690 dated Feb. 8, 2011.
International Search Report and Written Opinion of PCT/US2011/045653 dated Oct. 7, 2011.
International Search Report and Written Opinion of PCT/US2012/043740 dated Jan. 23, 2013.
International Search Report and Written Opinion of PCT/US2012/055070 dated Dec. 3, 2012.
International Search Report and Written Opinion of PCT/US2013/023362 dated Mar. 28, 2013.
International Search Report and Written Opinion of PCT/US2010/050699 dated Nov. 8, 2010.
International Search Report and Written Opinion of PCT/US2011/035143 dated Aug. 26, 2011.

HEAT STABILIZED POLYMERIC COMPOSITION WITH EPOXIDIZED FATTY ACID ESTER PLASTICIZER

PRIORITY

The present application is a continuation-in-part application to, and claims priority to, each of the following applications: U.S. patent application No. 61/247,427 filed on Sep. 30, 2009; U.S. patent application No. 61/247,329 filed on Sep. 30, 2009; U.S. patent application No. 61/247,383 filed on Sep. 30, 2009; and U.S. patent application No. 61/288,713 filed on Dec. 21, 2009. The content of each of the foregoing applications is incorporated herein by reference.

BACKGROUND

Plasticizers are compounds or mixtures of compounds that are added to polymer resins to impart softness and flexibility. Phthalic acid diesters (also known as "phthalates") are known plasticizers in many flexible polymer products, such as polymer products formed from polyvinyl chloride (PVC) and other vinyl polymers.

Phthalate plasticizers have recently come under intense scrutiny by public interest groups that are concerned about the negative environmental impact of phthalates and potential adverse health effects in humans (especially children) exposed to phthalates.

Epoxidized vegetable oils (such as epoxidized soybean oil, ESO) are known to be effective substitutes for phthalic acid diesters as coplasticizers and costabilizers for vinyl chloride resins, such as polyvinyl chloride (PVC). Epoxidized vegetable oil plasticizers are conventionally used in only small proportions (typically no more than 5 to 15 wt %) in a polymer matrix because the presence of a larger amount (greater than 15 wt %) tends to result in exudation ("spew"). Epoxidized vegetable oils also have the tendency to degrade at elevated temperatures. Such degradation is problematic as it causes the polymer to become brittle and discolored upon heat aging.

A need exists for epoxidized fatty acid ester that does not exude when applied as a plasticizer to polymeric compositions. A further need exists for polymeric compositions with epoxidized fatty acid ester plasticizer that are spew-free and are also thermally stable.

SUMMARY

The present disclosure provides a polymeric composition composed of a polyvinyl chloride resin, an epoxidized fatty acid ester, and a heat stabilizing composition. The heat stabilizing composition reduces/eliminates spew and thermally stabilizes the polymeric composition. In particular, the heat stabilizing composition stabilizes the polymeric composition during extrusion and/or heat aging by preventing decomposition of the fatty acid ester.

The present disclosure provides a polymeric composition. In an embodiment, a polymeric composition is provided and includes a vinyl chloride resin, an epoxidized fatty acid ester, and a heat stabilizing composition. The heat stabilizing composition includes a first metal salt, a second metal salt, and a β-diketone.

The present disclosure provides a coated conductor. In an embodiment, a coated conductor is provided and includes a conductor and a coating on the conductor. The coating includes a polymeric composition comprising (i) a vinyl chloride resin, (ii) an epoxidized fatty acid ester, and (iii) a heat stabilizing composition. The heat stabilizing composition includes a first metal salt, a second metal salt, and a β-diketone.

An advantage of the present disclosure is a bio-based plasticizer resulting in reduced, or no, loop spew when used in polymeric compositions.

An advantage of the present disclosure is a phthalate-free and/or lead-free bio-based plasticizer.

An advantage of the present disclosure is a bio-based plasticizer that reduces greenhouse gases.

An advantage of the present disclosure is a bio-based plasticizer which enables users to obtain LEED credits.

An advantage of the present disclosure is a bio-based plasticizer which enables users to obtain carbon credits.

An advantage of the present disclosure is a coating for wire and cable applications that is phthalate-free and/or lead-free.

An advantage of the present disclosure is a phthalate-free bio-based plasticizer that produces little, or no, loop spew when used in a polymeric composition that is applied as a wire/cable coating.

An advantage of the present disclosure is a polymeric composition containing an epoxidized fatty acid ester as the primary plasticizer.

An advantage of the present disclosure is a polymeric composition containing an epoxidized fatty acid ester as the sole plasticizer.

An advantage of the present disclosure is a coating for wire and cable applications which contains an epoxidized fatty acid ester as the primary plasticizer.

An advantage of the present disclosure is a coating for wire and cable applications which contains an epoxidized fatty acid ester as the sole plasticizer.

DETAILED DESCRIPTION

The present disclosure provides a polymeric composition. The polymeric composition includes a vinyl chloride resin, an epoxidized fatty acid ester, and a heat stabilizing composition. The heat stabilizing composition contains a first metal salt, a second metal salt, and a β-diketone.

Vinyl Chloride Resin

A "vinyl chloride resin," as used herein, is a polymer with repeating vinyl groups with at least one hydrogen replaced with a chloride group. The vinyl chloride resin can be prepared by such nonlimiting procedures as bulk polymerization, solution polymerization, suspension polymerization, and emulsion polymerization. Nonlimiting examples of suitable vinyl chloride resin include polyvinyl chloride, chlorinated polyvinyl chloride, polyvinylidene chloride, chlorinated polyethylene, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-maleate copolymer, vinyl chloride-methacrylate copolymer, vinyl chloride-acrylonitrile copolymer, vinyl chloride-vinyl ether copolymers, and blends thereof, as well as blends, block copolymers, and graft copolymers with chlorine-free synthetic resins, such as an acrylonitrile-styrene copolymer, an acrylonitrile-butadiene-styrene copolymer, an ethylene-vinyl acetate copolymer, an ethylene-ethyl (meth) acrylate copolymer, and a polyester.

The polymeric composition contains vinyl chloride resin in an amount from about 10, or 15, or 20, or 25, or 30, or 35, or 40, wt % to about 90, or 85, or 80, or 75, or 70, or 65, or 60 wt %. Weight percent is based on the total weight of the polymeric composition.

In an embodiment, the vinyl chloride resin is polyvinyl chloride.

Epoxidized Fatty Acid Ester (EFA)

The polymeric composition includes an epoxidized fatty acid ester. The polymeric composition may contain one, two, three or more epoxidized fatty acid esters. The term "epoxidized fatty acid ester," (or "EFA") as used herein, is a compound with at least one fatty acid moiety which contains at least one epoxide group. An "epoxide group" is a three-membered cyclic ether (also called oxirane or an alkylene oxide) in which an oxygen atom is joined to each of two carbon atoms that are already bonded to each other.

Nonlimiting examples of suitable epoxidized fatty acid esters include epoxidized animal and vegetable oils, such as naturally occurring epoxidized oils, epoxidized soybean oil (ESO), epoxidized corn oil, epoxidized sunflower oil, epoxidized linseed oil, epoxidized canola oil, epoxidized rapeseed oil, epoxidized safflower oil, epoxidized tall oil, epoxidized tung oil, epoxidized fish oil, epoxidized beef tallow oil, epoxidized castor oil, epoxidized methyl stearate, epoxidized butyl stearate, epoxidized 2-ethylhexyl stearate, epoxidized stearyl stearate, 3,4-epoxycyclohexylmethyl-3,4-epoxycyclohexane carboxylate epoxidized soybean oil, epoxidized propylene glycol dioleate, epoxidized palm oil, epoxidized fatty acid methyl esters, epoxidized derivatives of each of the foregoing, and any combination of the foregoing. A nonlimiting example of naturally occurring epoxidized oil is Vernonia oil.

The polymeric composition may include one or more of the following plasticizers alone, or in addition to, the EFA: epoxidized polybutadiene, tris(epoxypropyl)isocyanurate, bisphenol A diglycidyl ether, vinylcyclohexene diepoxide, dicyclohexene diepoxide, and any combination thereof.

The epoxidized fatty acid ester can be prepared in a variety of ways. Fatty acid can be reacted with an alcohol (mono-ol or polyol) to create ester linkages between the fatty acids and the alcohol by way of esterification, transesterification, or interesterification reactions, followed by epoxidation of the product of these esterification, transesterification, or interesterification reactions. Bounded by no particular theory, it is believed epoxidation increases the polarity and solubility parameter of the esterification, transesterification, or interesterification reaction products, resulting in increased compatibility of the epoxidized fatty acid ester with polyvinyl chloride resin.

Natural oils can be used as the starting material. In this instance, the natural oils may be saponified to the fatty acids and then esterified with alcohols as disclosed above. Next, the low molecular weight esters are epoxidized. The unsaturated ester can be epoxidized with a per-acid.

Alternatively, a glycidyl ester of the fatty acid can be prepared via epichlorohydrin or related chemicals. In yet another alternate embodiment, it is possible to transesterify the triglyceride with alcohols and then epoxidize the unsaturated fatty ester with a per-acid.

In an embodiment, the epoxidized fatty acid ester can be any epoxidized fatty acid $C_1$-$C_{14}$ ester, including methyl, ethyl, propyl, butyl, and 2-ethylhexyl esters. In a further embodiment, the epoxidized fatty acid ester is an epoxide of a fatty acid methyl ester.

A nonlimiting example for the preparation of an epoxide of a fatty acid methyl ester begins with soy oil, wherein the soy oil is transesterified with methanol to make the methyl ester of the fatty acids in the oil. Glycerol is removed from the reaction products due to insolubility. A solution of per-acetic acid in ethyl acetate is used to epoxidize the double bonds on the fatty acids. The per-acid is kept below 35% per-acid and 35 degrees Celsius to prevent detonation. After completion, the ethyl acetate and product acetic acid are removed via vacuum stripping.

The EFA functions as a plasticizer in the polymeric composition. A "plasticizer" is a substance that lowers the modulus and tensile strength, and increases flexibility, elongation, impact strength, and tear strength of the polymeric resin (typically a thermoplastic polymer) to which it is added. A plasticizer may also lower the melting point of the polymeric resin, lower the glass transition temperature, and/or enhance processability of the polymeric resin to which it is added.

The polymeric composition contains epoxidized fatty acid ester in an amount from about 10, or 15, or 20, or 25, or 30, or 35, or 40, wt % to about 90, or 85, or 80, or 75, or 70, or 65, or 60 wt %. Weight percent is based on the total weight of the polymeric composition.

In an embodiment, the EFA has an oxirane index (percent oxirane oxygen) from about 3, or 4, or 5, or 6 to about 12, or 10, or 8.

In an embodiment, the EFA has an iodine value (g iodine/100 g) less than 5, or less than 3, or less than 2, or from 0 to less than 5.

In an embodiment, the epoxidized fatty acid ester is epoxidized soybean oil.

In an embodiment, the EFA is the primary plasticizer present in the polymeric composition. In a further embodiment, the EFA is the sole plasticizer present in the polymeric composition.

In an embodiment, the EFA is a bio-based plasticizer composition. A "bio-based plasticizer composition," as used herein, is a plasticizer composition composed of a vegetable-derived material. A bio-based plasticizer composition is advantageous because it reduces greenhouse gas emissions, and enables the user to obtain carbon and/or LEED (Leadership in Energy and Environmental Design) credits.

Although the composition of this disclosure may be phthalate-free, in an embodiment, the plasticizer composition may also comprise other plasticizers including, but not limited to, phthalates (such as di-isononyl phthalate, diallyl phthalate, di-2-ethylhexyl-phthalate, dioctyl phthalate, diisodecyl phthalate and diisotridecyl phthalate), trimellitates (such as trioctyl trimellitate, triisononyl trimellitate and triisodecyl trimellitate), citrates, Grindsted® Soft-N-Safe acetylated monoglyceride of hydrogenated castor oil (product of Danisco), Hexamoll® DINCH diisononyl ester of 1,2-Cyclohexanedicarboxylic acid (product of BASF), benzoates and adipic polyesters.

Heat Stabilizing Composition

The polymeric composition includes a heat stabilizing composition. The heat stabilizing composition includes (i) a first metal salt, (ii) a second metal salt, and (iii) a diketone.

The metal for each metal salt may be an alkali metal (such as lithium, sodium, and potassium), an alkaline earth metal (such as magnesium, calcium, strontium, and barium), zinc, aluminum, tin, and/or alkyltin. Non limiting examples of suitable metal salts include organic carboxylates, such as stearates, laurates, oleates, maleate, benzoates, phosphates, such as stearyl phosphate, distearyl phosphate, phenyl phosphate, and diphenyl phosphate, and basic salts, carbonates, and sulfates thereof, metal oxides, and metal hydroxides thereof.

In an embodiment, the metal salts are selected from calcium stearate, zinc stearate, barium stearate, cadmium stearate, organotin compounds such as dibutyltin dilaurate, dibutyltin dimaleate.

In an embodiment, the metal in the first metal salt is zinc and the metal in the second metal salt is selected from calcium or barium.

In an embodiment, the first metal salt is zinc stearate. The second metal salt is calcium stearate.

In an embodiment, the first metal salt is zinc stearate. The second metal salt is barium stearate.

The heat stabilizing composition may also include hydrotalcites, zeolites, lubricants and/or perchlorates.

Diketone

The heat stabilizing composition includes a diketone, such as a β-diketone. Nonlimiting examples of suitable multiketone and β-diketone compounds include acetylacetone, triacetylmethane, 2,4,6-heptatrione, butanoylacetylmethane, lauroylacetylmethane, palmitoylacetylmethane, stearoylacetylmethane, phenylacetylacetylmethane, dicyclohexylcarbonylmethane, benzoylformylmethane, benzoylacetylmethane, dibenzoylmethane (Rhodiastab® 83), palmitoyl benzoyl methane, stearoyl benzoyl methane, octylbenzoylmethane, bis(4-octylbenzoyl)methane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, cyclohexane-1,3-dione, 3,6-dimethyl-2,4-dioxycyclohexane-1-carboxylic acid methyl ester, 2-acetylcyclohexanone, dimedone, 2-benzoylcyclohexane, and any combination of the foregoing. A nonlimiting example of suitable mixtures of palmitoyl benzoyl methane and stearoyl benzoyl methane is Rhodiastab® 50.

In an embodiment, the heat stabilizing composition is lead-free. Nonlimiting examples of suitable lead-free heat stabilizing compositions include Mark® 6797, Mark® 6777 ACM, Therm-Chek® RC215P, Therm-Chek® 7208, Naftosafe® EH-314, Baeropan® MC 90400 KA, Baeropan® MC 90400 KA/1, Baeropan® MC 9238 KA-US, Baeropan® MC 90249 KA, and Baeropan® MC 9754 KA.

The heat stabilizing composition is present in the polymeric composition in an amount from about 0.1, or 0.2, or 0.4, or 0.6 wt % to about 10.0, or 7.0, or 5.0 wt %. Weight percent is based on the total weight of the polymeric composition.

In an embodiment, the individual components of the heat stabilizing composition (a first metal salt, a second metal salt, and a diketone) may not all be present in one compound, but instead may be added separately to the polymer composition.

The polymeric composition is generally prepared according to conventional dry blend or wet blend methods. The mixtures obtained from the blending process can be further compounded with a mixer such as a Banbury batch mixer, a Farrel Continuous Mixer, or a single or twin screw extruder.

In an embodiment, the present polymeric composition is made by absorption of the plasticizers disclosed herein into PVC powder to make a dry blend. Any suitable method/apparatus may be used to make the dry blend including, but not limited to, a Henschel mixer or a ribbon blender. The polymeric composition may contain other additives in addition to the PVC and the plasticizer. The dry blend may then be further compounded by melt blending (extrusion, as an example) and formed into any desired shape (film, pellet, etc.).

In an embodiment, the polymeric composition is melt blended. The melt blended polymeric composition is molded into a plaque.

In an embodiment, the polymeric composition is melt blended and molded into a plaque. The plaque has a Shore hardness from about D10, or D20, or D30 to about D70, or D60, or D50. Shore hardness is measured in accordance with ASTM D 2240.

In an embodiment, the polymeric composition is melt blended and molded into a plaque. The plaque has a tensile strength retention greater than about 70%, or greater than about 80%, or greater than 90%, after 168 hours heat aging at 113° C. as measured on dogbones cut from 30 mil thick plaques in accordance with ASTM D 638.

In an embodiment, the polymeric composition is melt blended and molded into a plaque. The plaque has a tensile strength retention greater than about 70%, or greater than 80%, or greater than 90%, after 168 hours heat aging at 136° C. as measured on dogbones cut from 30 mil thick plaques in accordance with ASTM D 638.

In an embodiment, the present polymeric composition is melt blended and molded into a plaque. The plaque has a tensile elongation retention greater than about 30%, or greater than 35%, or greater than 40%, or greater than 70%, or greater than about 80%, or greater than 90%, or greater than 95%, after 168 hours heat aging at 113° C. as measured on 30 mil thick plaques in accordance with ASTM D 638.

In an embodiment, the present polymeric composition is melt blended and molded into a plaque. The plaque has a tensile elongation retention greater than about 30%, or greater than 35%, or greater than 40%, or greater than 70%, or greater than 80%, or greater than 90% after 168 hours heat aging at 136° C. as measured on 30 mil thick plaques in accordance with ASTM D 638.

Each of the tensile strength and the tensile elongation is measured for (i) unaged and (ii) heat aged dogbone specimens cut from compression molded plaques in accordance with ASTM D-638.

In an embodiment, the polymeric composition is melt blended and molded into a plaque. The plaque exhibits no discoloration (i.e., retains color). The color is determined by visual inspection.

In an embodiment, the polymeric composition is melt blended and molded into a plaque. The plaque exhibits slight or no exudate (spew) on the surface after 48 hours exposure at 23° C. The presence of exudate is determined by way of the loop spew test.

In an embodiment, the polymeric composition is melt blended and molded into a plaque. The plaque exhibits slight or no exudate (spew) on the surface after aging for 7 days at 113° C. The presence of exudate is determined by visual inspection.

In an embodiment, the polymeric composition is melt blended and molded into a plaque. The plaque exhibits slight or no exudate (spew) on the surface after aging for 7 days at 136° C. The presence of exudate is determined by visual inspection.

In an embodiment, the polymeric composition is melted blended and molded into a plaque. After exposure to 136° C. for 7 days, a specimen of 1.25 inch diameter that is cut from 30 mil thick molded plaques maintains greater than 96%, or greater than 96.5%, or greater than 97.0% of its original weight (i.e. weight prior to heat aging).

In an embodiment, the polymeric composition is melt blended and molded into a plaque. The plaque exhibits an oxidative induction time at 200° C. of greater than 20 minutes, or greater than 25 minutes, or greater than 30 minutes.

In an embodiment, the polymeric composition is melt blended and molded into a plaque. The plaque exhibits a secant modulus retention after aging at 113° C. for 8 weeks of less than 300%, or less than 250%, or less than 200%.

Additives

Any of the foregoing polymeric compositions may include one or more of the following additives: a filler, an antioxidant, a flame retardant (antimony trioxide, molybdic oxide and alumina hydrate), an anti-drip agent, a colorant, a lubricant, a low molecular weight polyethylene, a hindered amine light stabilizer (having at least one secondary or tertiary amine group) ("HALS"), UV light absorbers (such as o-hydroxyphenyltriazines), curing agents, boosters and retardants, processing aids, coupling agents, antistatic agents, nucleating agents, slip agents, viscosity control agents, tackifiers, antiblocking agents, surfactants, extender oils, acid scavengers, metal deactivators, and any combination thereof.

In an embodiment, the present polymeric composition includes a filler. Nonlimiting examples of suitable fillers include talc, calcium carbonate, calcined clay, whiting, fuller's earth, magnesium silicate, barium sulfate, calcium sulfate, strontium sulfate, titanium dioxide, magnesium oxide, magnesium hydroxide, calcium hydroxide, hydrophilic fumed silica, hydrophobic (surface treated) fumed silica, and any combination of the foregoing. Nonlimiting examples of calcined clay are Satintone® SP-33 and Polyfil® 70.

In an embodiment, the present polymeric composition includes an antioxidant. Nonlimiting examples of suitable antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis (3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl) diphenylamine, diphenyl-p-phenylenediamine, mixed di-aryl-p-phenylenediamines, and other hindered amine antidegradants or stabilizers. Nonlimiting examples of suitable antioxidants include Topanol® CA, Vanox® 1320, Irganox® 1010, Irganox® 245 and Irganox® 1076. The antioxidant (or antioxidants) may be added to the plasticizer (or plasticizer composition) of this disclosure. Antioxidants can be used in amounts of 0.01 to 5 wt % based on the weight of the polymeric composition.

In an embodiment, the present polymeric composition includes a lubricant. Nonlimiting examples of suitable lubricants include stearic acid, metal salts of stearic acid, paraffin wax, and polyethylene glycols. The lubricants may be used alone or in combination. The lubricant may also be combined with the heat stabilizing composition.

In an embodiment, the present polymeric composition includes a processing aid. Nonlimiting examples of suitable processing aids include metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of 0.05 to 5 wt % based on the weight of the polymeric composition.

In an embodiment, the polymeric composition includes a stabilizer and an antioxidant. With an optimal stabilizer and antioxidant package, the present polymeric compositions are suitable for applications requiring long term dry or wet insulation resistance testing at elevated temperatures, and other demanding applications where temperatures are as high as 136° C.

The present polymeric composition(s) may comprise two or more embodiments disclosed herein.

Coated Conductor

The foregoing properties of the present polymeric composition make it well suited for articles such as wire and cable coating applications (jackets, insulation), and high temperature wire/cable applications in particular. Accordingly, the present disclosure provides a coated conductor. A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

The conductor may be a single cable or a plurality of cables bound together (i.e., a cable core, or a core). A "cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The coated conductor may be flexible, semi-rigid, or rigid.

A coating is located on the conductor. The coating may be one or more inner layers such as an insulating layer and/or a semiconducting layer. The coating may also include an outer layer (also referred to as a "jacket" or a "sheath"). The coating includes any of the present polymer compositions as disclosed herein. As used herein, "on" includes direct contact or indirect contact between the coating and the conductor. "Direct contact" is a configuration whereby the coating immediately contacts the conductor, with no intervening layer(s) and/or no intervening material(s) located between the coating and the conductor.

"Indirect contact" is a configuration whereby an intervening layer(s) and/or an intervening structure(s) or material(s) is/are located between the conductor and the coating. The coating may wholly or partially cover or otherwise surround or encase the conductor. The coating may be the sole component surrounding the conductor. Alternatively, the coating may be one layer of a multilayer jacket or sheath encasing the metal conductor.

The coating includes the present polymeric resin. The polymeric resin may be any polymeric resin as disclosed herein. The polymeric resin includes (i) a vinyl chloride resin, (ii) an epoxidized fatty acid ester, and (iii) a heat stabilizer composition. The heat stabilizing composition includes a first metal salt, a second metal salt, and a β-diketone.

In an embodiment, the epoxidized fatty acid ester is the primary plasticizer in the coating. In a further embodiment, the epoxidized fatty acid ester is the sole plasticizer in the coating.

In an embodiment, the epoxidized fatty acid ester present in the coating is epoxidized soybean oil.

The coating may have any of the properties as discussed above for the present composition. In an embodiment, the coated conductor passes the heat test as measured in accordance with UL-1581.

The present polymeric composition unexpectedly exhibits the properties of flexibility, low plasticizer volatility, low migration (low/no spew), low viscosity, and high thermal stability while simultaneously containing epoxidized fatty acid ester as the primary plasticizer or as the sole plasticizer in the composition. The present polymeric composition unexpectedly meets and/or exceeds the rigorous 136° C. heat aging test. When extruded as a coating on a conductor, the present polymeric composition unexpectedly meets and/or exceeds the rigorous dry and wet insulation resistance tests at elevated temperatures (e.g., 75° C. wet or 97° C. dry).

Nonlimiting examples of suitable coated conductors include flexible wiring such as flexible wiring for consumer electronics, a power cable, a power charger wire for cell phones and/or computers, computer data cords, power cords, appliance wiring material, building wire, automotive wire, and consumer electronic accessory cords.

The present coated conductor may comprise two or more embodiments disclosed herein.

The coated conductor, such as a coated wire or a coated cable (with an optional insulation layer), with a jacket comprising the composition disclosed herein can be prepared with various types of extruders, e.g., single or twin screw types. A description of a conventional extruder can be found in U.S. Pat. No. 4,857,600. An example of co-extrusion and an extruder can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

The wire and cable constructions (i.e., a coated metal conductor) of this disclosure are made by extruding the present composition onto the conductor or onto the bundle of insulated conductors to form a coating (or a jacket) around the insulated conductors. The thickness of the jacket or insulation depends on the requirements of the desired end use application. Typical thickness of the jacket or insulation is from about 0.010 inches to about 0.200 inches, or from about 0.015 inches to about 0.050 inches. The present composition may be extruded into the jacket from previously made composition. Usually the present composition is in the form of pellets for easy feeding into the extruder. The wire and cable jacket or insulation may be extruded directly from the compounding extruder without going through the separate step of pelletizing the present composition. This one-step compounding/extrusion process would eliminate one heat history step for the composition.

A nylon layer may also be extruded over the insulation, such as in conventional THHN, THWN and THWN-2 constructions.

Nonlimiting examples of embodiments of the present disclosure are provided below.

In an embodiment E1, a polymeric composition is provided and comprises a vinyl chloride resin, an epoxidized fatty acid ester, and a heat stabilizing composition. The heat stabilizing composition includes a first metal salt, a second metal salt and a β-diketone. E2. The polymeric composition of E1 wherein the epoxidized fatty acid ester has an oxirane index from about to about 3 wt % to about 12 wt %. E3. The polymeric composition of any of E1-E2 wherein the epoxidized fatty acid has an iodine number from 0 to less than 5. E4. The polymeric composition of any of E1-E3 wherein the epoxidized fatty acid is an epoxidized soybean oil. E5. The polymeric composition of any of E1-E4 wherein the heat stabilizing composition comprises two different metals, each metal selected from the group consisting of lithium, sodium, potassium, magnesium, calcium, strontium, barium, zinc, aluminum, and tin. E6. The polymeric composition of any of E1-E5 wherein the first metal salt comprises zinc and the second metal salt comprises a metal selected from the group consisting of barium and calcium. E7. The polymeric composition of any of E1-E6 wherein the heat stabilizing composition comprises a β-diketone selected from the group consisting of dibenzoylmethane, stearoylbenzoylmethane, palmitoyl benzoyl methane, and combinations thereof. E8. The polymeric composition of any of E1-E7 having a loop spew value from 0-2 as measured in accordance with ASTM D 3291. E9. The polymeric composition of any of E1-E8 having a tensile elongation retention greater than about 30% after 168 hours heat aging at 136° C. as measured in accordance with UL 1581 and ASTM D 638.

In an embodiment, E10, a polymeric composition is provided and comprises a polyvinyl chloride resin, an epoxidized soybean oil, and a heat stabilizing composition. The heat stabilizing composition comprises a first metal salt, a second metal salt, and a β-diketone. E11. The polymeric composition of E10 wherein the heat stabilizing composition comprises zinc stearate and a β-diketone selected from the group consisting of dibenzoylmethane, stearoylbenzoylmethane, palmitoyl benzoyl methane, and combinations thereof.

In an embodiment, E12, a coated conductor is provided and comprises a conductor; and a coating on the conductor. The coating comprises the polymeric composition of any of embodiments E1-E11.

Definitions

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1.

These are only examples of what is specifically intended, and all possible combinations of numerical values between the lowest value and the highest value enumerated, are to be considered to be expressly stated in this disclosure. Numerical ranges are provided within this disclosure for, among other things, the amounts for components in the composition and/or coating, additives, and various other components in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometallic compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

"Blend," "polymer blend" and like terms mean a blend of two or more polymers, as well as blends of polymers with various additives. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms mean a mixture or blend of two or more components.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

In an embodiment, the compositions disclosed herein are phthalate-free. The term "phthalate-free composition," as used herein, is a composition devoid of phthalate or is otherwise free of phthalate. A "phthalate," is a compound which includes the following structure (I):

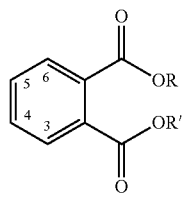
(I)

wherein R and R' may be the same or different. Each of R and R' is selected from a substituted-/unsubstituted-hydrocarbyl group having 1 to 20 carbon atoms. As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups. Each position 3, 4, 5, and 6 may be populated by hydrogen or other moiety.

The term "polymer" (and like terms) is a macromolecular compound prepared by reacting (i.e., polymerizing) monomers of the same or different type. "Polymer" includes homopolymers and copolymers.

Test Methods

The presence of diketones in the heat stabilizing composition is determined by extraction at 1 wt % with stabilized THF, followed by liquid injection GC-MS. The identification of the beta-diketone is performed through interpretation of the mass spectra and comparison to external standards.

Iodine value measures the degree of unsaturation in oils and is determined in accordance with AOCS Official Method Cd 1-25 (g $I_2$/100 g).

Loop spew is measured in accordance with ASTM D 3291 which determines the compatibility of plasticizers in poly (vinyl chloride) plastics by rating the amount of plasticizer that spews due to compressional stress set up inside a 180° loop bend. Briefly, using this method, test specimens of plasticized poly(vinyl chloride) sheet are bent through an arc of approximately 180° and secured in a jig designed to hold them in the desired conformation. The specimens are held at controlled temperature (i.e., 23° C.) and, at specified intervals of time, a specimen is removed, bent 180° in the opposite direction, and the former inside of the loop is examined for evidence of plasticizer spew by visual inspection and by wiping the area with a dry index finger. Table 1 shows the ranking of values for loop spew.

TABLE 1

| Description (Spew/Migration level) | Amount of exudate | Ranking |
|---|---|---|
| Completely dry in loop (no visible evidence in loop) (i.e., no spew or no migration) | none | 0 |
| Slippery with slight amounts of oily substances on the inside of the loop (i.e., low spew or low migration) | slight | 1 |
| Slippery with moderate amounts of oily substances on the inside of the loop (i.e., moderate spew or moderate migration) | moderate | 2 |
| Slippery with large amounts of oily substances on the inside of the loop (i.e., high spew or high migration) | heavy/dripping | 3 |

Oxidative Induction Time (OIT) at 200° C. is determined using differential scanning calorimetry (DSC). The DSC cell is pre-checked to ensure that the instrument has been accurately calibrated for temperature using high purity indium (melting point=156.6° C.). Before the experiment, it is ensured that the DSC cell will achieve an isothermal temperature of 200.0° C. and nitrogen and oxygen purge gases are connected to the DSC purge gas entry port. A sample mass of approximately 10 to 15 mg is used in an open aluminum pan. The most consistent OIT results are obtained using a single piece disk test specimen. So molded plaque material is used to ensure that the sample is homogeneous with minimal impact on test results. The sample is heated under a nitrogen purge from room temperature to specified temperature at a rate of 20° C./min. The sample is held under the nitrogen purge at the specified temperature for a 5 minute period to allow the sample and DSC cell to thermally equilibrate at the target temperature. After 5 minute hold period, the gas is switched from nitrogen to an oxygen purge. The sample is held under isothermal conditions with the oxygen purge until a significant oxidative exothermic response is obtained. The time that is required for this to occur is dependent upon the relative oxidative stability of the material being tested. The experiment is terminated only after a significant exothermic onset is obtained (i.e., abort next segment if mW>2.00). The OIT value is defined as the onset time established by using the onset option in the DSC data analysis software.

Oxirane index (oxirane oxygen content) is determined in accordance with AOCS Official Method Cd 9-57.

Plasticizer compatibility in the polymeric composition is also assessed by visual inspection of molded or extruded specimens aged at elevated temperatures (e.g., 113° C. or 136° C.) for defined lengths of time (e.g., 7 days). The extruded specimens may be in the form of a wire (i.e., insulation extruded over conductor).

Shore hardness is determined in accordance with ASTM D 2240.

Surface smoothness of coated conductors (extruded wires) is measured using a surface roughness measuring apparatus made by Mitutoyo of Japan, in accordance with ANSI/ASME B46.1.

Tensile strength (TS), tensile strength retention (TSR), tensile elongation TE), tensile elongation retention (TER) and secant modulus (at 2 inch/min) on unaged specimens, on specimens aged at 113° C. or at 136° C. or at 60° C. (QUV chamber and 90% relative humidity) for up to 8 weeks, is determined in accordance with ASTM D 638 and UL 1581/2556 either on dogbones cut from molded plaques or tubular insulations removed from coated conductors (extruded wires).

The term "UL 1581" is Underwriters Laboratories Reference Standard for Electrical Wires, Cables, and Flexible Cords. UL 1581 contains specific details for conductors, insulation, jackets and other coverings, and for methods of sample preparation, specimen selection and conditioning, and for measurement and calculation that are required in wire and cable standards.

Volume resistivity (Ohm-cm) at 23° C., with 500 volts direct current, is measured in accordance with ASTM D 257. Specimens of 3.5 inch diameter are cut from 40 mil thick molded plaques and tested using a Hewlett Packard 16008A Resistivity Cell connected to a Hewlett Packard 4329A High Resistance Meter.

Weight Retained (%) after 7 Days at 136° C. is measured on specimens of 1.25 inch diameter that are cut from 30 mil thick molded plaques.

Wet insulation resistance (WIR) is measured on wire samples with 14 AWG solid copper conductor and 0.015 in. insulation thickness according to UL 83/2556. The sample lengths are 14 feet, with 10 feet in a coil immersed in water and 2 feet on both ends acting as leads to the power source. The samples are aged in a water bath at 75° C. and under 600 VAC for a period of up to 36 weeks. The insulation resistance is measured with 500 V DC applied for 60 seconds with a Quadtech 1868A megohmmeter. The first measurement is conducted after 6 hours of water immersion, with no voltage applied. All subsequent measurements are taken at a weekly frequency.

By way of example, and not by limitation, examples of the present disclosure are provided.

EXAMPLES

The components for Examples 1-6 and Comparative Samples (CS) 1-8 are provided in Table 2 below.

TABLE 2

|  | Examples 1-6 | CS 1-4 | CS 5-6 | CS 7-8 |
| --- | --- | --- | --- | --- |
| PVC OxyVinyls ® 240F | 63.0 | 63.0 | 62.3 | 60.3 |
| Plasticizer PLAS-CHEK ® 775 ESO | 27.3 | 27.3 | 30.0 | 30.0 |
| Filler Satintone ® SP-33 clay | 6.4 | 6.4 | 6.4 | 6.4 |
| Antioxidant Irganox ® 1076 | 0.3 | 0.3 | 0.3 | 0.3 |
| Heat stabilizing composition | 3.0 | 0.0 or 3.0 | 1.0 | 3.0 |

All values are wt %.
Wt % based on total weight of composition

The composition of various heat stabilizing compositions is provided in Table 3, as obtained from the material safety data sheets of the various materials (except the presence of diketone, which was determined by extraction at 1 wt % with stabilized THF, followed by liquid injection GC-MS). Weight percent is based on the total weight of the heat stabilizing composition.

TABLE 3

Components of stabilizing compositions

|  | Manufacturer | Chemical Family | Composition | Wt % | CAS Number |
| --- | --- | --- | --- | --- | --- |
| Mark ® 6797 | Chemtura | Calcium-Zinc | Zinc Stearate | 10-30 | 557-05-1 |
|  |  |  | Sodium Perchlorate | 3-7 | 7601-89-0 |
|  |  |  | Inorganic Silicate | 1-5 | Not Established |
|  |  |  | Diketone - R83 | 1.6 |  |
| Mark ® 6776ACM | Chemtura | Barium-Zinc | Inorganic Acid Acceptor | <55 | Trade secret |
|  |  |  | Barium Stearate | <35 | 6865-35-6 |
|  |  |  | Zinc Stearate | <10 | 557-05-1 |
|  |  |  | Zinc Carboxylate | <10 | Trade secret |
|  |  |  | Diketone - n/a |  |  |
| Baeropan ® MC 90249 KA | Baerlocher | Calcium-Zinc | Zinc Compounds | <10 | Not Listed |
|  |  |  | Diketone - R83, R50 |  |  |

TABLE 3-continued

Components of stabilizing compositions

| Manufacturer | Chemical Family | Composition | Wt % | CAS Number |
|---|---|---|---|---|
| Baeropan ® MC 9238 KA-US | Baerlocher | Calcium-Zinc | Zinc Compounds | <15 | Not Listed |
| | | | Bisphenol A Diketone - R83, R50 | <10 | Not Listed |
| Baeropan ® MC8553 KA-ST 3-US | Baerlocher | Calcium-Zinc | Zinc Compounds | 80-90 | Not Listed |
| | | | Diketone - n/a | | |
| Baeropan ® MC 9754 KA | Baerlocher | Calcium-Zinc | Zinc Compounds | 20-30 | Not Listed |
| | | | Diketone - R83 | | |
| Baerlocher zinc stearate RSN 131 HS Granular HyDense, Code 8512 | Baerlocher | Zinc | Zinc Stearate | 90-100 | 557-05-1 |
| | | | Diketone - n/a | | |
| Therm-Chek ® RC215P | Ferro | | Stearate | 20-30 | Not Listed |
| | | | Diketone - R50 | 1.6 | |
| Therm-Chek ® 7208 | Ferro | | Stearate | 40-50 | Not Listed |
| | | | Diketone - R83 | 1.8 | |

R83 - Rhodiastab 83 dibenzoylmethane (CAS 61346-73-4)
R50 - Rhodiastab 50 palmitoyl benzoyl methane/Stearoylbenzoylmethane (CAS 58446-52-9)
n/a—not applicable (because none was detected)

Analytical testing of the various heat stabilizing compositions is conducted to check for the presence of β-diketones such as Rhodiastab 83 (dibenzoylmethane) and Rhodiastab 50 (mixture of palmitoyl benzoyl methane and stearoyl benzoyl methane). The heat stabilizing compositions in comparative samples 2, 3 and 4 (CS 2, CS 3 and CS 4) do not contain β-diketones.

The following procedure is used to prepare the compositions of Examples 1-6 and CS 1-8.
Preheat the plasticizer to 60° C. for at least 60 minutes and shake before use
Weigh the individual ingredients
First make 'dry blends' by soaking the plasticizer composition into PVC powder, and then make melt mixtures
The following procedure is used for preparation of 'dry blends':
(a) Make "solids mixture" by mixing everything (except plasticizer and filler) in a container using spatula.
(b) Use "40 cm$^3$" Brabender mixing bowl with sigma blades at 90° C. and 40 rpm.
(c) After 2 minute warm-up, add the solids mixture. Mix for 30 seconds.
(d) Add plasticizer. Mix for 360 seconds (6 minutes).
(e) Add clay filler. Mix for 60 seconds.
(f) Stop and remove "dry blend".
The 'dry blends' are subsequently melt mixed using the following procedure:
(a) Use "40 cm$^3$" Brabender mixing bowl with cam rotors at 40 rpm setting.
(b) Add 'dry blend', and mix at 180° C. for 2 minutes.

The blend compositions removed from the mixing bowl are compression molded at 180° C. for 5 minutes, and the color of the resulting plaques is recorded (with cream color being desirable). The hardness, weight, tensile strength, elongation (at 2 inch/min) are measured on unaged specimens and specimens aged at 113° C. or 136° C. for 168 hours, that have been cut from 30 mil thick molded plaques. The heat aged specimens are also examined visually for evidence of exudate (spew) at the surface. Volume resistivity is measured at 23° C. on specimens cut from 40 mil thick molded plaques. Shore hardness is measured on molded specimens of 250 mil thickness. The results are given in Table 4 below.

TABLE 4

Properties of Examples (Ex) 1-6 and Comparative Samples (CS) 1-8

| Heat Stabilizer | Color of Molded Plaque (unaged) | Shore (D) | TS (un-aged) - psi | TSR (%) after 113° C. Aging | TSR (%) after 136° C. Aging | TE (un-aged) - % | TER (%) after 113° C. Aging |
|---|---|---|---|---|---|---|---|
| Ex. 1 3 wt % Mark ® 6797 | Cream | 43.6 ± 0.8 | 3985 ± 195 | 102 ± 5 | 141 ± 4 | 286 ± 15 | 99 ± 4 |
| Ex. 2 3 wt % Baeropan ® MC 90249 KA | Cream | 43.4 ± 0.4 | 4047 ± 65 | 101 ± 2 | 100 ± 3 | 278 ± 6 | 99 ± 2 |
| Ex. 3 3 wt % Baeropan ® MC 9238 KA-US | Cream | 43.0 ± 0.4 | 3794 ± 154 | 106 ± 5 | 109 ± 7 | 254 ± 12 | 109 ± 6 |
| Ex. 4 3 wt % Baeropan ® MC 9754 KA | Cream | 43.2 ± 0.5 | 3708 ± 126 | 109 ± 3 | 105 ± 9 | 260 ± 20 | 107 ± 7 |
| Ex. 5 3 wt % Therm-Chek ® RC215P | Cream | 43.2 ± 0.4 | 4104 ± 86 | 103 ± 2 | 102 ± 3 | 272 ± 11 | 98 ± 2 |
| Ex. 6 3 wt % Therm-Chek ® 7208 | Cream | 43.2 ± 0.3 | 4065 ± 115 | 103 ± 3 | 109 ± 4 | 276 ± 10 | 104 ± 2 |

TABLE 4-continued

Properties of Examples (Ex) 1-6 and Comparative Samples (CS) 1-8

| Heat Stabilizer | Color | Shore (D) | TS (psi) | TE (%) | TSR (%) after 7 days @ 113° C. | TSR (%) after 7 days @ 136° C. | TER (%) after 113° C. Aging |
|---|---|---|---|---|---|---|---|
| CS 1 None | Amber | 50.2 ± 0.9 | 4068 ± 107 | 108 ± 5 | 155 ± 6 | 244 ± 7 | 85 ± 7 |
| CS 2 3 wt % zinc stearate | Cream | 44.7 ± 0.4 | 3487 ± 276 | 117 ± 14 | 187 ± 8 | 186 ± 53 | 105 ± 51 |
| CS 3 3 wt % Mark ® 6776 ACM | Amber | 43.3 ± 0.2 | 4302 ± 205 | 96 ± 6 | 101 ± 8 | 278 ± 6 | 98 ± 6 |
| CS 4 3 wt % Baeropan ® MC8553 KA-ST 3-US | Amber | 44.7 ± 0.9 | 4039 ± 103 | 100 ± 5 | 99 ± 4 | 280 ± 7 | 101 ± 1 |
| CS 5 1 wt % zinc stearate | Cream | 37.0 ± 0.5 | 3765 ± 107 | 103 ± 1 | 132 ± 5 | 275 ± 3 | 96 ± 5 |
| CS 6 1 wt % calcium stearate | Light Brown | 34.9 ± 0.6 | 3750 ± 112 | 99 ± 6 | 109 ± 6 | 256 ± 4 | 95 ± 4 |
| CS 7 3 wt % zinc stearate | Cream | 35.5 ± 1.3 | 3676 ± 165 | 103 ± 12 | 132 ± 18 | 204 ± 19 | 103 ± 31 |
| CS 8 3 wt % calcium stearate | Pink-Brown | 33.0 ± 0.3 | 3346 ± 74 | 98 ± 16 | 121 ± 8 | 259 ± 9 | 86 ± 22 |

| Heat Stabilizer | TER (%) after 136° C. Aging | WR (%) after 7 days @ 136° C. | Exudate on surface after 7 days @ 113° C. | Exudate on surface after 7 days @ 136° C. | Loop spew - 48 hours at 23° C. | VR (Ohms cm) at 23° C. |
|---|---|---|---|---|---|---|
| Ex. 1 3 wt % Mark ® 6797 | 42 ± 1 | 98.0 | None | None | Very Slight | 6.41E+12 |
| Ex. 2 3 wt % Baeropan ® MC 90249 KA | 81 ± 6 | 99.2 | None | None | Very Slight | 5.54E+15 |
| Ex. 3 3 wt % Baeropan ® MC 9238 KA-US | 88 ± 7 | 99.4 | None | None | Very Slight | 7.06E+15 |
| Ex. 4 3 wt % Baeropan ® MC 9754 KA | 91 ± 15 | 99.7 | None | None | Slight | 4.17E+14 |
| Ex. 5 3 wt % Therm-Chek ® RC215P | 88 ± 5 | 99.2 | None | None | Slight | 5.88E+15 |
| Ex. 6 3 wt % Therm-Chek ® 7208 | 95 ± 9 | 99.5 | None | None | Very Slight | 5.25E+15 |
| CS 1 None | 9 ± 2 | 91.7 | None | None | None | 6.37E+16 |
| CS 2 3 wt % zinc stearate | 2 ± 0 | 93.7 | Heavy | Heavy | Moderate | 2.50E+15 |
| CS 3 3 wt % Mark ® 6776 ACM | 92 ± 7 | 99.6 | None | None | None | 6.30E+15 |
| CS 4 3 wt % Baeropan ® MC8553 KA-ST 3-US | 85 ± 6 | 99.3 | None | None | None | 1.31E+16 |
| CS 5 1 wt % zinc stearate | 48 ± 2 | 99.9 | None | None | Moderate | 4.29E+15 |
| CS 6 1 wt % calcium stearate | 73 ± 4 | 99.7 | None | None | Moderate | 2.26E+15 |
| CS 7 3 wt % zinc stearate | 25 ± 18 | 96.6 | Heavy | Heavy | Moderate | 1.90E+15 |
| CS 8 3 wt % calcium stearate | 10 ± 6 | 86.5 | None | None | Moderate | 1.94E+15 |

Shore (D) = Shore D hardness ASTM D2240
TE = Tensile elongation, ASTM D638
TER = Tensile elongation retention, ASTM D638
TER 113° C. = Tensile elongation retention (%), specimen aged at 113° C. for 168 hours
TER 136° C. = Tensile elongation retention (%), specimen aged at 136° C. for 168 hours
TS = Tensile strength, ASTM D638
TSR = Tensile strength retention, ASTM D638
TSR 113° C. = Tensile strength retention, (%), specimen aged at 113° C. for 168 hours
TSR 136° C. = Tensile strength retention, (%), specimen aged at 136° C. for 168 hours
VR = Volume Resistivity (Ohms cm)
WR = Weight Retained
Zinc stearate = Baerlocher zinc stearate (RSN 131 HS Granular HyDense, Code 8512)
Calcium stearate = Mallinckrodt calcium stearate RSN 248-D Examples 1-6 exhibit satisfactory properties before and after heat aging. In contrast, comparative sample 1 (CS 1), made without any heat stabilizer, shows inferior properties, i.e., amber color (indicative of degradation), higher density, higher weight loss and poor retention of tensile elongation after aging at 136° C. Comparative samples 2, 5 and 7 (CS 2, CS5 and CS7), containing zinc stearate as heat stabilizing composition, result in substantial exudation (spew) and vastly inferior retention of tensile elongation after aging at 136° C. Comparative samples 3 and 4 (CS 3 and CS4), mixtures of metal salts without diketones, also exhibit amber color, indicating that significant degradation has occurred during the melt mixing and compression molding steps. Comparative samples 6 and 8 (CS6 and CS8), containing calcium stearate as heat stabilizing composition, result in significant discoloration, exudation (spew) and inferior retention of tensile elongation after aging at 136° C.

Examples 1-6 demonstrate that PVC/ESO composition with 0.2 to 10 wt % of a heat stabilizing composition containing a mixed metal soap and a β-diketone yields superior properties.

Example 7 and Comparative Samples 9 to 11

The components for Example 7 and Comparative Samples 9-11 are provided in Table 5 below.

TABLE 5

|  | Example 7 | CS 9-11 |
| --- | --- | --- |
| PVC<br>OxyVinyls ® 240F | 61.6 | 61.6 |
| Plasticizer<br>PLAS-CHEK ® 775 ESO | 28.7 | 28.7 |
| Filler<br>Satintone ® SP-33 clay | 6.4 | 6.4 |
| Antioxidant<br>Irganox ® 1076 | 0.3 | 0.3 |
| Heat stabilizing composition | 3.0 | 0.0 or 3.0 |

The following procedure is used to prepare the compositions of Example 7 and CS 9-11.

Preheat the plasticizer to 60° C. for at least 60 minutes and shake before use

Weigh out the individual ingredients

First make 'dry blends' by soaking plasticizer into PVC powder, and then make melt mixtures The following procedure is used for preparations of 'dry blends':
  (a) Make "solids mixture" by mixing everything (except plasticizer and filler) in a container using spatula.
  (b) Use "250 cm$^3$" Brabender mixing bowl with sigma blades at 90° C. & 40 rpm.
  (c) After 2 min warm-up, add the solids mixture. Mix for 30 seconds.
  (d) Add plasticizer. Mix for 360 seconds (6 minutes).
  (e) Add filler. Mix for 60 seconds.
  (f) Stop and remove "dry blend".

The 'dry blends' are subsequently melt mixed using the following procedure:
  (a) Use "250 cm$^3$" Brabender mixing bowl with cam rotors at 40 rpm setting.
  (b) Add 'dry blend', and mix at 180° C. for 2 minutes.

The blend compositions removed from the mixing bowl are compression molded at 180° C. for 5 minutes, and the color of the resulting plaques is recorded (with cream color being desirable). The weight, tensile strength/elongation (at 2 inch/min) is measured on unaged specimens and specimens aged at 113° C. or 136° C. or 60° C. (QUV chamber and 90% relative humidity) for up to 8 weeks, that have been cut from 30 mil thick molded plaques. The heat aged specimens are also examined visually for evidence of exudate (spew) at the surface. The oxidative induction time is also measured. The results are given in Table 6.

TABLE 6

Properties of Example 7 and Comparative Samples 9-11

| Heat Stabilizer | Color of Molded Plaque (unaged) | Color of Molded Plaque (after 8 weeks at 113° C.) | TS (un-aged) - psi | TSR (%) after 8 weeks at 113° C. | TE (un-aged) - % | TER (%) after 8 weeks at 113° C. |
| --- | --- | --- | --- | --- | --- | --- |
| Ex. 7<br>3 wt % Baeropan ®<br>MC 90249 KA | Cream | Dark Brown | 3189 ± 114 | 91 ± 8 | 323 ± 16 | 104 ± 2 |
| CS 9<br>None | Amber | Black | 3298 ± 118 | 174 ± 11 | 296 ± 5 | 19 ± 4 |
| CS 10<br>3 wt % zinc stearate | Cream | Not Available | 2717 ± 41 | Not Available | 264 ± 15 | Not Available |
| CS 11<br>1 wt % zinc stearate | Cream | Dark Brown | 2972 ± 276 | 117 ± 15 | 323 ± 51 | 71 ± 23 |

| | SMR (%) after 8 weeks | Exudate on surface after 8 weeks @ | WR (%) after 14 days | WR (%) after 14 days in QUV @ 60° C. and | Oxidative Induction Time (minutes) at |

TABLE 6-continued

Properties of Example 7 and Comparative Samples 9-11

| Heat Stabilizer | at 113° C. | 113° C. | @ 136° C. | 90% RH | 200° C. |
|---|---|---|---|---|---|
| Ex. 7<br>3 wt % Baeropan ®<br>MC 90249 KA | 74 ± 6 | None | 99.6 | 99.5 | 94 |
| CS 9<br>None | 1189 ± 106 | None | 82.2 | 99.5 | 9 |
| CS 10<br>3 wt % zinc stearate | Not Available | Not Available | 78.0 | 98.3 | 20 |
| CS 11<br>1 wt % zinc stearate | 563 ± 322 | None | 89.7 | 98.6 | Not Available |

SMR = Secant modulus retention (%), specimen aged at 113° C. for 8 weeks
TE = Tensile elongation, ASTM D638
TER = Tensile elongation retention, ASTM D638
TER 113° C. = Tensile elongation retention (%), specimen aged at 113° C. for 8 weeks
TS = Tensile strength, ASTM D638
TSR = Tensile strength retention, ASTM D638
TSR 113° C. = Tensile strength retention, (%), specimen aged at 113° C. for 8 weeks
WR = Weight Retained
Zinc stearate = Baerlocher zinc stearate (RSN 131 HS Granular HyDense, Code 8512)

Compared to CS9-11, the composition of Example 7 exhibits vastly superior oxidative induction time; weight retention at elevated temperatures (even when exposed to UV and high humidity at 90% relative humidity); secant modulus retention and tensile elongation retention after aging at elevated temperature for as long as 8 weeks.

Examples 8 and 9

The components of Examples 8 and 9 are provided in Table 7 below.

TABLE 7

|  | Example 8 | Example 9 |
|---|---|---|
| PVC<br>OxyVinyls ® 240F | 63.0 | 65.0 |
| Plasticizer<br>PLAS-CHEK ® 775 ESO | 27.3 | 27.3 |
| Filler<br>Satintone ® SP-33 clay | 6.4 | 6.4 |
| Antioxidant<br>Irganox ® 1076 | 0.3 | 0.3 |
| Heat stabilizing composition<br>3 wt % Baeropan ® MC 90249 KA | 3.0 | 1.0 |

The following procedure is used to prepare the compositions of Examples 8 and 9.

Preheat the plasticizer to 60° C. for at least 60 minutes and shake before use

Weigh out the individual ingredients

First make 'dry blends' by soaking plasticizer into PVC powder, and then make melt mixtures The following procedure is used for preparations of 'dry blends':

(a) Make "solids mixture" by mixing everything (except plasticizer and filler) in a container using spatula.

(b) Use a Henschel type high-intensity mixer to prepare 3 kg of 'dry blend' at a set temperature of 90° C. and 1800 rpm, by first fluxing the solids mixture for 60 seconds, then adding and mixing the plasticizer over a period of 360 seconds (6 minutes), and finally adding the clay and mixing for additional 90 seconds.

(c) Stop and remove "dry blend".

The 'dry blends' are subsequently melt mixed using a conical twin screw extruder (25:1 L/D) at 45 rpm and set temperature profile of zone 1=170° C., zone 2=175° C., zone 3=180° C., die=185° C. The extruded strands are subsequently air cooled and pelletized.

The pellets are compression molded at 180° C. for 5 minutes. Specimens are cut from 30 mil molded plaques for testing of all properties except volume resistivity and Shore hardness. Volume resistivity is measured on specimens cut from 40 mil thick molded plaques. Shore hardness is measured on molded specimens of 250 mil thickness. The pellets are also used to fabricate wire/cable by coating onto a 0.064 inch (14 AWG) solid copper conductor using 25:1 single-screw extruder at 40 rpm and set temperatures of 170° C., 175° C.; 180° C.; 185° C. The outside diameter of the coated conductor is approximately 0.094 inch (i.e., approximately 0.015 inch thick insulation). Die pressures during wire extrusion are noted. The results are given in Table 8 and 9 below. Wet insulation resistance measurements at 75° C. of the wires are given in Table 10.

The compositions of Examples 8 and 9 result in (1) spew-free smooth cable coating with (2) excellent retention of tensile properties after heat aging at 136° C. and (3) excellent electrical properties. In particular, the long-term wet insulation resistance of the wires is excellent, well above the minimum pass requirement of 0.115 Megaohms/1000 ft and passing the stability criteria of less than 2% decrease per week in insulation resistance after 24 weeks.

TABLE 8

Properties of Molded Plaques of Examples 8-9

| Heat Stabilizer | Color of Molded Plaque (unaged) | Shore (D) | TS (un-aged) - psi | TSR (%) after 113° C. Aging | TSR (%) after 136° C. Aging | TE (un-aged) - % | TER (%) after 113° C. Aging |
|---|---|---|---|---|---|---|---|
| Ex. 8 3 wt % Baeropan ® MC 90249 KA | Cream | 41.3 ± 0.9 | 3952 ± 178 | 102 ± 2 | 126 ± 8 | 268 ± 10 | 105 ± 4 |
| Ex. 9 1 wt % Baeropan ® MC 90249 KA | Cream | 43.4 ± 0.4 | 4242 ± 98 | 101 ± 2 | 104 ± 2 | 286 ± 12 | 105 ± 7 |

| Heat Stabilizer | TER (%) after 136° C. Aging | WR (%) after 7 days @ 136° C. | Exudate on surface after 7 days @ 113° C. | Exudate on surface after 7 days @ 136° C. | Loop spew - 48 hours at 23° C. | VR (Ohms cm) at 23° C. |
|---|---|---|---|---|---|---|
| Ex. 8 3 wt % Baeropan ® MC 90249 KA | 86 ± 7 | 99.5 | None | None | None | 1.19E+16 |
| Ex. 9 1 wt % Baeropan ® MC 90249 KA | 86 ± 3 | 99.7 | None | None | Slight | 1.77E+16 |

TABLE 9

Results from Wire Extrusion of Examples 8-9

| Heat Stabilizer | Die Pressure (psi) | Surface Smoothness (□ in) | TS (Unaged) - psi | TSR 136° C. | TE (Unaged) - % | TER 136° C. |
|---|---|---|---|---|---|---|
| Ex. 8 3 wt % Baeropan ® MC 90249 KA | 1590 | 15.7 ± 1.6 | 2737 ± 37 | 148 ± 1 | 127 ± 9 | 94 ± 8 |
| Ex. 9 1 wt % Baeropan ® MC 90249 KA | 1620 | 24.7 ± 9.1 | 2904 ± 128 | 150 ± 9 | 122 ± 5 | 95 ± 7 |

TE = Tensile elongation (%), ASTM D638
TER = Tensile elongation retention (%), ASTM D638
TS = Tensile strength, ASTM D638
TSR = Tensile strength retention, ASTM D638

TABLE 10

Wet Insulation Resistance (Megaohms/1000 ft) at 75° C. of Wires Made from Examples 8-9

| | \multicolumn{13}{c}{Days in 75° C. Water} |
|---|---|---|---|---|---|---|---|---|---|---|---|---|---|
| | 0.25 | 7 | 14 | 21 | 28 | 35 | 42 | 49 | 56 | 63 | 70 | 77 | 84 | 91 |
| Ex. 8 | 0.502 | 1.031 | 0.833 | 0.781 | 0.807 | 0.384 | 0.697 | 0.66 | 0.538 | 0.525 | 0.596 | 0.539 | 0.5 | 0.511 |
| Ex. 9 | 0.891 | 1.388 | 1.069 | 0.963 | 0.987 | 0.861 | 0.907 | 0.769 | 0.652 | 0.65 | 0.659 | 0.615 | 0.608 | 0.617 |

| | 98 | 105 | 112 | 126 | 146 | 153 | 160 | 167 | 174 | 181 | 188 | 195 | 202 |
|---|---|---|---|---|---|---|---|---|---|---|---|---|---|
| Ex. 8 | 0.465 | 0.5 | 0.476 | 0.473 | 0.441 | 0.435 | 0.433 | 0.42 | 0.396 | 0.4 | 0.396 | 0.392 | 0.391 |
| Ex. 9 | 0.609 | 0.634 | 0.553 | 0.549 | 0.597 | 0.588 | 0.586 | 0.563 | 0.547 | 0.552 | 0.55 | 0.549 | 0.553 |

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A polymeric composition comprising:
    from about 40 wt % to about 70 wt % of a vinyl chloride resin;
    from about 10 wt % to about 60 wt % of an epoxidized fatty acid ester; and
    from about 0.2 wt % to about 10 wt % of a heat stabilizing composition comprising a first metal salt, a second metal salt and a β-diketone, and the polymeric composition has a loop spew value from 0 to 2 as measured in accordance with ASTM D 3291.

2. The polymeric composition of claim 1 wherein the epoxidized fatty acid ester has an oxirane index from about 3 wt % to about 12 wt %.

3. The polymeric composition of claim 1 wherein the epoxidized fatty acid has an iodine number from 0 to less than 5.

4. The polymeric composition of claim 1 wherein the epoxidized fatty acid is an epoxidized soybean oil.

5. The polymeric composition of claim 1 wherein the heat stabilizing composition comprises two different metals, each metal selected from the group consisting of lithium, sodium, potassium, magnesium, calcium, strontium, barium, zinc, aluminum, and tin.

6. The polymeric composition of claim 1 wherein the first metal salt comprises zinc and the second metal salt comprises a metal selected from the group consisting of barium and calcium.

7. The polymeric composition of claim 1 wherein the heat stabilizing composition comprises a β-diketone selected from the group consisting of dibenzoylmethane, stearoylbenzoylmethane, palmitoyl benzoyl methane, and combinations thereof.

8. The polymeric composition of claim 1 having a tensile elongation retention greater than about 30% after 168 hours heat aging at 136° C. as measured in accordance with ASTM D 638.

9. A coated conductor comprising:
  a conductor; and
  a coating on the conductor, the coating comprising a polymeric composition comprising
    (i) from about 40 wt % to about 70 wt % of a vinyl chloride resin;
    (ii) from about 10 wt % to about 60 wt % of an epoxidized fatty acid ester; and
    (iii) from about 0.2 wt % to about 10 wt % of a heat stabilizing composition comprising a first metal salt, a second metal salt and a β-diketone, the coating having a loop spew from 0 to 2 as measured in accordance with ASTM D 3291.

* * * * *